United States Patent [19]
Yanagawa et al.

[11] Patent Number: 5,179,604
[45] Date of Patent: Jan. 12, 1993

[54] WAVEGUIDE-TYPE COUPLER/SPLITTER

[75] Inventors: Hisaharu Yanagawa, Tokyo; Takeo Shimizu, Kanagawa; Shiro Nakamura; Isao Oyama, both of Chiba, all of Japan

[73] Assignee: The Furukawa Electric Co., Ltd., Tokyo, Japan

[21] Appl. No.: 813,968

[22] Filed: Dec. 24, 1991

[30] Foreign Application Priority Data

Dec. 27, 1990 [JP] Japan .................................. 2-407852

[51] Int. Cl.$^5$ .............................................. G02B 6/28
[52] U.S. Cl. ...................................... 385/24; 385/21; 385/31
[58] Field of Search ...................... 385/24, 21, 31, 20, 385/22; 395/115, 127

[56] References Cited

U.S. PATENT DOCUMENTS

| | | | |
|---|---|---|---|
| 4,953,935 | 9/1990 | Suchoski, Jr. et al. | 385/46 |
| 5,000,530 | 3/1991 | Takahashi | 385/24 X |
| 5,074,634 | 12/1991 | Takahashi | 385/24 X |

FOREIGN PATENT DOCUMENTS

| | | | |
|---|---|---|---|
| 0251427 | 1/1988 | European Pat. Off. | 385/24 |
| 2231412 | 11/1990 | United Kingdom | 385/24 |

OTHER PUBLICATIONS

Patent Abstracts of Japan, vol. 11, No. 197, Jun. 25, 1987, Fiber Type Optical Frequency Demultiplexer and Multiplexer.
Optics Letters, vol. 12, No. 7, Jul. 1987, pp. 534-535, Wavelength-Insensitive Couplers Using Dispersive Materials.
Electronics Letters, vol. 23, No. 18, Aug. 1987, pp. 948-949, High-Performance Guided-Wave Multi-/Demultiplexer Based on Novel Design using Embedded Gradient-Index Waveguides in Glass.
"Silica Waveguide Integrated Circuit Technology" by T. Miyashita et al; Tech Dig. 7th International Conf. on Integrated Optics and Fiber Communication, 18D1-1, Kobe, pp. 52-53.

Primary Examiner—Brian Healy
Assistant Examiner—Phan T. Heartney
Attorney, Agent, or Firm—Frishauf, Holtz, Goodman & Woodward

[57] ABSTRACT

A 2-input/2-output directional coupler is arranged as an element coupler/splitter for a first stage, and 1-input/2-output coupler/splitters are used as element coupler/splitters for a second stage and subsequent stages. Output ports of these element coupler/splitters are concatenated with input ports of other element coupler/splitters to form a 2-input/multi-output coupler/splitter. An optical signal can be inputted through one input port of the first-stage 2-input/2-output directional coupler, and an optical signal for optical line monitoring can be inputted through the other input port. It is unnecessary, therefore, to use an optical wavelength division multiplexer/demultiplexer or other optical part which conventionally is connected at the time of optical line monitoring.

5 Claims, 3 Drawing Sheets 5,179,604

WAVEGUIDE-TYPE COUPLER/SPLITTER

BACKGROUND OF THE INVENTION

1. Field of the Invention

The present invention relates to waveguide-type coupler/splitters effectively used in an optical fiber communication system and optical sensor system, and more particularly, to waveguide-type coupler/splitters which need not be connected with any other optical parts, such as an optical wavelength division multiplexer/demultiplexer, at the time of optical line monitoring in these systems.

2. Description of the Prior Art

In an optical fiber communication system, such as the one shown in FIG. 1, a signal transmitted from one parent station 1 is divided into N number of signals by means of a 1-input/N-output waveguide-type coupler/splitter 2, and the individual signals are distributed to N number of child stations $4_1$, $4_2$, ... $4_N$ by means of N number of fiber lines $3_1$, $3_2$, ... $3_N$, respectively.

Referring now to FIGS. 2 to 7, 1-input/16-output versions of the coupler/splitter 2 adapted to be used in this system will be described by way of example.

A coupler/splitter A of the type shown in FIG. 2 uses, as each of its element coupler/splitters, a 1-input/2-output Y-branch waveguide I in which two output ports $I_b$ and $I_c$ are continuous with an input port $I_a$, as shown in FIG. 3. The input and output ports $I_a$, $I_b$ and $I_c$ of these individual element coupler/splitters are concatenated to one another in four stages in a tournament-list style.

A coupler/splitter B of the type shown in FIG. 4 uses, as each of its element coupler/splitters, a 1-input/2-output directional connector II formed of a 1-input/2-output Y-branch waveguide and having a junction $II_d$ at which one of two waveguides is continuous and the other is discontinuous, as shown in FIG. 5. Input and output ports $II_a$, $II_b$ and $II_c$ of these individual element coupler/splitters are concatenated to one another in four stages.

A coupler/splitter C of the type shown in FIG. 6 uses, as each of its element coupler/splitters, a 1-input/2-output directional coupler III formed of a 1-input/3-output Y-branch waveguide and having a junction $III_d$ at which two waveguides are discontinuous with another waveguide, as shown in FIG. 7. Input and output ports $III_a$, $III_b$ and $III_c$ of these individual element coupler/splitters are concatenated to one another in four stages.

In monitoring the optical fiber lines $3_1$, $3_2$, ... $3_N$ without interrupting communication between the parent station and the child stations $4_1$, $4_2$, ... $4_N$, in the optical communication system shown in FIG. 1, it is necessary to connect an optical line monitoring device (e.g., OTDR) 5, which uses light with a monitoring wavelength $\lambda_2$ different from a communication wavelength $\lambda_1$, as shown in FIG. 8, to the arrowed spot (FIG. 1) of an optical path connecting the parent station 1 and the 1-input/N-output coupler/splitter 2, through an optical wavelength division multiplexer/demultiplexer 6 for synthesizing and dividing light waves with the wavelengths $\lambda_1$ and $\lambda_2$.

Thus, when using the 1-input/N-output coupler/splitter 2 composed of the concatenated 1-input/2-output element coupler/splitters I, II or III of the conventional configuration described above, the interposition of another optical part, such as the optical wavelength division multiplexer/demultiplexer ($\lambda_1 \neq \lambda_2$) or an optical coupler ($\lambda_1 = \lambda_2$), is required in connecting the optical line monitoring device 5 between the coupler/splitter 2 and the parent station 1.

OBJECT AND SUMMARY OF THE INVENTION

The object of the present invention is to provide a waveguide-type coupler/splitter capable of optical line monitoring without the interposition of any other optical part, such as an optical wavelength division multiplexer/demultiplexer or optical coupler.

In order to achieve the above object, according to the present invention, there is provided a waveguide-type coupler/splitter which comprises a plurality of element coupler/splitters concatenated to one another, input ports of the individual element coupler/splitters being connected to output ports of other element coupler/splitters, the element coupler/splitter in a first stage being a 2-input/2-output coupler/splitter, and each of the element coupler/splitters in a second stage and the subsequent stages being a 1-input/2-output coupler/splitter.

In the coupler/splitter of the present invention, the first-stage element coupler/splitter is a 2-input/2-output coupler/splitter, and therefore, the input ports thereof can be used separately, one for communication and the other for optical line monitoring. Alternatively, the two input ports may be used individually as a running version and as a stand-by (spare).

DETAILED DESCRIPTION OF THE PREFERRED EMBODIMENTS

Figure 1:
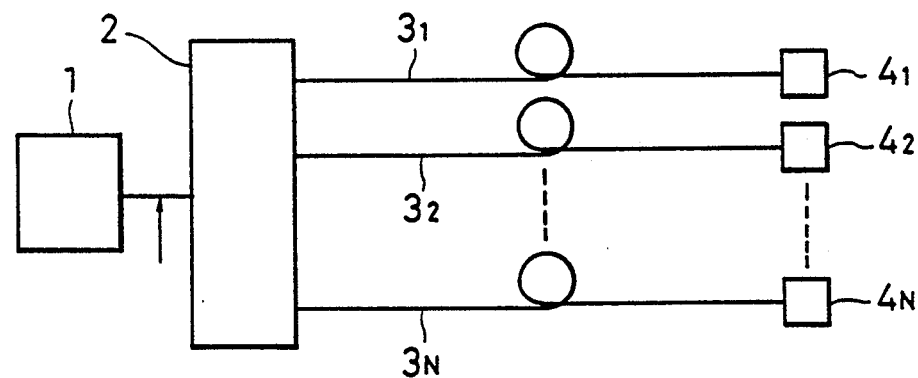
FIG. 1 is a schematic view showing an example of an optical fiber communication system.
Figure 2:
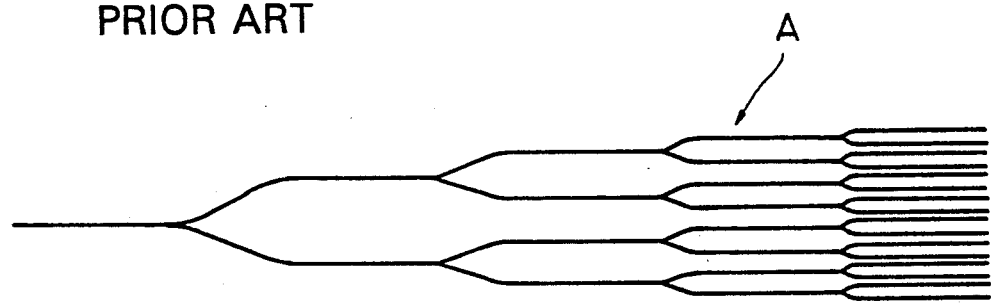
FIG. 2 is a schematic view showing an example of a conventional waveguide-type coupler/splitter.
Figure 3:
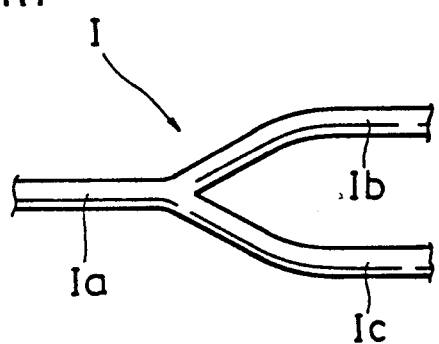
FIG. 3 is a schematic view showing a 1-input/2-output element coupler/splitter of the Y-branch waveguide type used in the coupler/splitter of FIG. 2.
Figure 4:
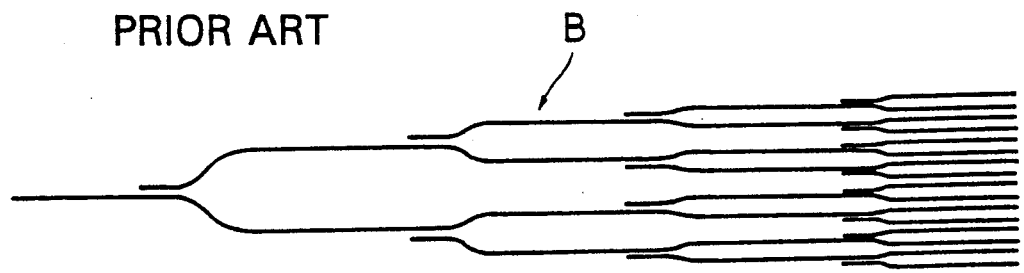
FIG. 4 is a schematic view showing another example of the conventional waveguide-type coupler/splitter.
Figure 9:
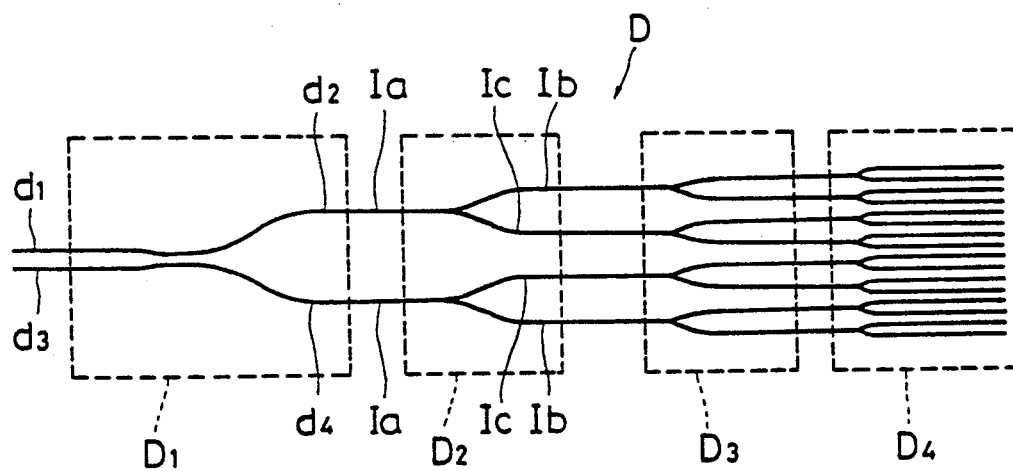
FIG. 9 is a schematic view showing a 2-input/16-output waveguide-type coupler/splitter according to the present invention.
Figure 10:
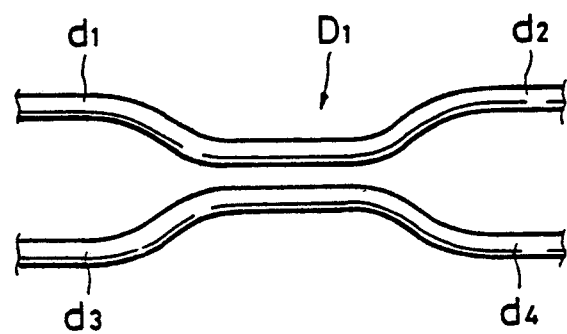
FIG. 10 is a schematic view showing a 2-input/2-output element coupler/splitter of the directional connector type arranged in a first stage of the coupler/splitter of the present invention.

FIG. 9 is a schematic view showing a 2-input/16-output coupler/splitter. In this coupler/splitter D, a first-stage element coupler/splitter $D_1$ is a 2-input/2-output coupler/splitter, as shown in FIG. 10. The input port $I_a$ of the Y-branch waveguide I shown in FIG. 3 is concatenated to each of output ports $d_2$ and $d_4$ of the coupler/splitter $D_1$, thus forming a second-stage element coupler/splitter group $D_2$ having four output ports. Further, the input port $I_a$ of the Y-branch waveguide I is concatenated to each of the output ports $I_b$ and $I_c$ of each group-$D_2$ Y-branch waveguide, thus forming a third-stage element coupler/splitter group $D_3$ having eight output ports. Likewise, the input port $I_a$ of the Y-branch waveguide I is concatenated to each of the output ports $I_b$ and $I_c$ of each group-group $D_3$ Y-branch waveguide, thus forming a fourth-stage element coupler/splitter group $D_4$ having sixteen output ports.

After the formation of the group $D_4$, additional Y-branch waveguides are successively concatenated in the same manner as aforesaid. If the 1-input/2-output element coupler/splitters are connected in $(n-1)$ stages in all, the resulting coupler/splitter becomes a 2-input/$2^n$-output coupler/splitter.

Figure 5:
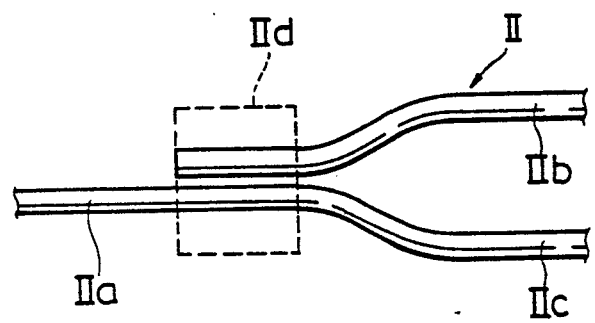
FIG. 5 is a schematic view showing a 1-input/2-output element coupler/splitter of the directional connector type used in the coupler/splitter of FIG. 4.
Figure 6:
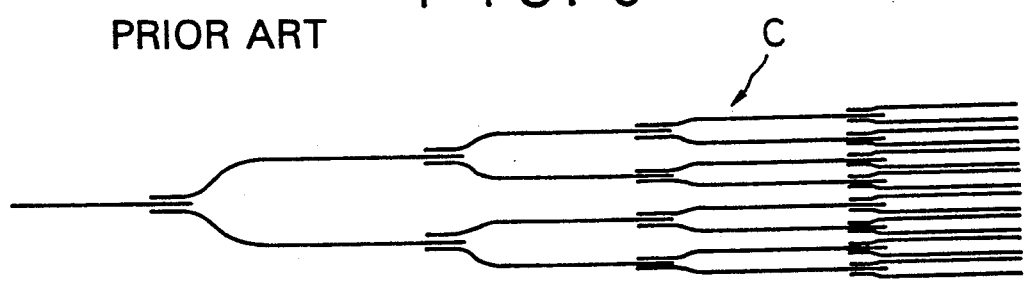
FIG. 6 is a schematic view showing still another example of the conventional waveguide-type coupler/splitter.
Figure 7:
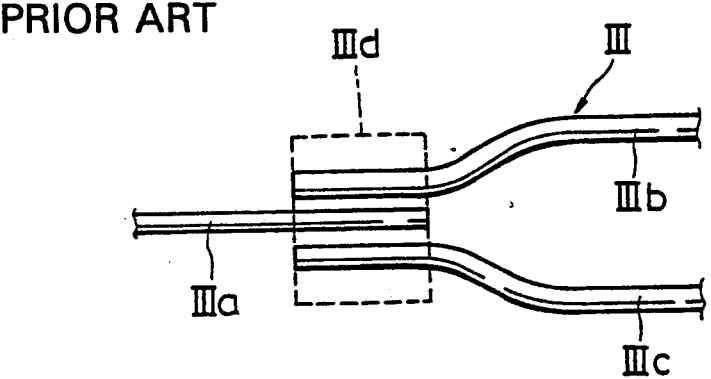
FIG. 7 is a schematic view showing a 1-input/2-output element coupler/splitter of the directional connector type used in the coupler/splitter of FIG. 6.
Figure 8:
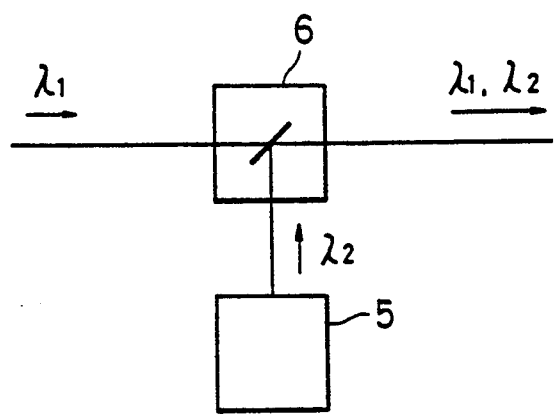
FIG. 8 is a schematic view showing an optical part interposed for optical line monitoring in the optical communication system of FIG. 1.

The element coupler/splitters concatenated in the second stage and its subsequent stages are not limited to the Y-branch waveguide I shown in FIG. 3, and may be of the type II shown in FIG. 5 or the type III shown in FIG. 7 or suitable combinations of these types I, II and III.

In the waveguide-type coupler/splitter according to the present invention, the coupler/splitter $D_1$ as an element coupler/splitter in the first stage is arranged so that a signal with a communication wavelength $\lambda_1$ is inputted through the one input port $d_1$ (or $d_2$), while a light beam for optical line monitoring with a monitoring wavelength $\lambda_2$ is inputted through the other input port $d_2$ (or $d_1$).

Preferably, the coupler/splitter $D_1$ should be one whose branch coupling ratio for light having a wavelength intermediate between the communication wavelength $\lambda_1$ and the monitoring wavelength $\lambda_2$ is wavelength-independent, that is, a coupler/splitter which is wavelength-flattened between the communication and monitoring wavelengths.

As an example of the coupler/splitter of this type, there is an asymmetric Mach-Zehnder interferometer (WINC) which is proposed in Topical Meeting on Integrated Photonic Research 1990, W17.

Preferably, the coupler/splitter $D_1$ is arranged so that a slit is cut in the one input port $d_1$, for example, and a filter which transmits light with the communication wavelength $\lambda_1$ and reflects light with the monitoring wavelength $\lambda_2$ is housed in the slit, and at the same time, another slit is cut in the other input port $d_2$, and a filter which reflects light with the communication wavelength $\lambda_1$ and transmits light with the monitoring wavelength $\lambda_2$.

Thus, according to the present waveguide-type coupler/splitter, the element coupler/splitters used are equal in number to the ones used in the conventional coupler/splitter. Since the first-stage element coupler/splitter is a 2-input/2-output coupler/splitter, however, one of its input ports can be used for optical line monitoring, so that it is unnecessary to use an exclusive optical part for optical line monitoring which conventionally is essential.

What is claimed is:

1. A waveguide-type coupler/splitter comprising:
   a plurality of element coupler/splitters concatenated to one another in stages, input ports of said individual element coupler/splitters being connected to output ports of other element coupler/splitters,
   said element coupler/splitter in only a first stage being a 2-input/2-output coupler/splitter, and
   each of said element coupler/splitters in a second stage and in subsequent stages being a 1-input/2-output coupler/splitter.

2. A waveguide-type coupler/splitter according to claim 1, wherein said first-stage element coupler/splitter has a branch coupling ratio, for light having a wavelength within a predetermined range, which is wavelength-independent.

3. A waveguide-type coupler/splitter according to claim 1, wherein one of the input ports of said first-stage element coupler/splitter is provided with a filter adapted to transmit light with a communication wavelength and reflect light with a monitoring wavelength, and the other input port is provided with a slit adapted to reflect light with the communication wavelength and transmit light with the monitoring wavelength.

4. A waveguide-type coupler/splitter according to claim 1, wherein each of said element coupler/splitters in the second stage and the subsequent stages comprises a Y-branch waveguide.

5. A waveguide-type coupler/splitter according to claim 1, wherein each of said element coupler/splitters in the second stage and the subsequent stages comprises a 1-input/2-output directional coupler having a junction at which two waveguides for output are discontinuous with one waveguide for input.

* * * * *